United States Patent [19]
Kato

[11] Patent Number: 5,762,568
[45] Date of Patent: Jun. 9, 1998

[54] GOLF BALL

[75] Inventor: Akira Kato, Shirakawa, Japan

[73] Assignee: Sumitomo Rubber Industries, Ltd., Hyogo-ken, Japan

[21] Appl. No.: 814,999

[22] Filed: Mar. 14, 1997

[30] Foreign Application Priority Data

Mar. 15, 1996 [JP] Japan ................... 8-087588

[51] Int. Cl.$^6$ ........................ A63B 37/06; A63B 37/12
[52] U.S. Cl. ........................ 473/365; 473/378; 473/357
[58] Field of Search ..................... 473/365, 378, 473/357, 351

[56] References Cited

U.S. PATENT DOCUMENTS 5,674,137  10/1997  Maruko et al. ............... 473/351 X

FOREIGN PATENT DOCUMENTS

0674923A1  10/1995  European Pat. Off.
2291812     2/1996  United Kingdom.
2301831    12/1996  United Kingdom.

*Primary Examiner*—George J. Marlo
*Attorney, Agent, or Firm*—Birch, Stewart, Kolasch & Birch, LLP

[57] ABSTRACT

The present invention provides a multi-layer structure golf ball using a thread wound core, which has good shot feel and attains long flight distance. The golf ball comprises a thread wound core composed of a solid center and thread rubber layer on the center, and a cover covering the thread wound core, the cover having two layered structure comprising an inner layer cover and an outer layer cover, wherein the inner layer cover has a specific gravity of 1–1.8 and a thickness of 0.5–3 mm, the outer layer cover has a specific gravity of 0.9–1.1 and a thickness of 1–3 mm, the specific gravity of the inner layer cover is larger than that of the outer layer cover, the solid center has a diameter of from 28 to 35 mm, the thread rubber has a thickness of from 1 to 5.5 mm, and a ratio of (diameter (mm) of the solid center)/(amount of deformation (mm) formed by applying a load of from an initial load of 10 Kg to a final load of 130 Kg to the thread wound core) is from 5 to 15.

2 Claims, 1 Drawing Sheet

GOLF BALL

FIELD OF THE INVENTION

The present invention relates to a golf ball. More particularly, it relates to a golf ball having a multi-layer structure using a thread wound core, which has good shot feel (shot feel at the time of hitting) and attains long flight distance.

BACKGROUND OF THE INVENTION

Recently, an ionomer resin has widely been used as a base resin for cover of the golf ball (e.g. Japanese Patent Publication No. 49-27093). Particularly, the ionomer resin is mainly used for two-piece golf balls using a solid core. This is because the ionomer resin is superior in processability to the other base resin for cover, and is superior in durability, cut resistance and rebound performance.

However, the ionomer resin has a drawback that the shot feel of the ionomer-covered golf ball has hard and poor shot feel in comparison with a balata (transpolyisoprene)-covered thread wound golf ball, because the ionomer resin is hard and rigid.

On the other hand, the multi-layer structured golf ball using a thread wound core is generally composed of a thread wound core and a cover covering the thread wound core, the thread wound core being composed of a solid center or a liquid center and a thread rubber layer formed by winding thread rubber in the stretched state around the center.

The multi-layer golf ball using a thread wound core has better shot feel than a two-piece solid golf ball using a solid core. However, it is poor in flight distance in comparison with the two-piece solid golf ball, because a spin amount is large and a launch angle is low. The cover of the multi-layer structured golf ball using a thread wound core is generally formed from balata which, however, has poor cut resistance and, therefore, the balata-cover golf ball has a problem of easy scratch.

OBJECTS OF THE INVENTION

In order to solve the above problem, the present inventors have intensively studied and have found that a golf ball, which has good shot feel and attains long flight distance, can be obtained by constituting the cover with a two-layer structure of an inner layer cover and an outer layer cover and adjusting a specific gravity of the inner layer cover to the value larger than that of the outer layer cover in the multi-layer structure golf ball using a thread wound core. Thus, the present invention has been completed.

A main object of the present invention is to solve the above problems of the multi-layer structure golf ball using a thread wound core, thereby providing a golf ball which has good shot feel and attains long flight distance.

This object as well as other objects and advantages of the present invention will become apparent to those skilled in the art from the following description with reference to the accompanying drawings.

SUMMARY OF THE INVENTION

Figure 1:
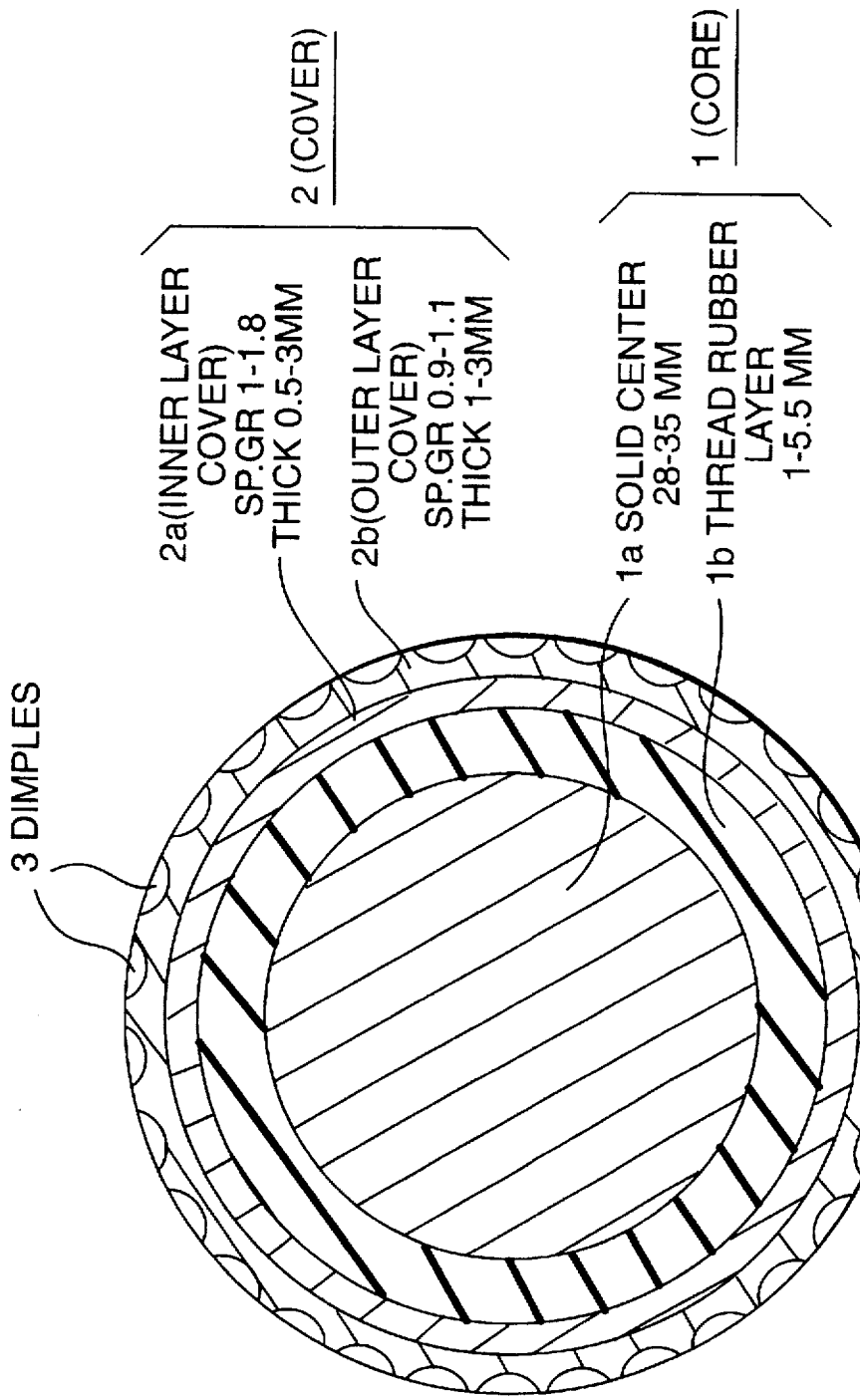
FIG. 1 is a schematic cross section illustrating one embodiment of the golf ball of the present invention.

The present invention provides a golf ball comprising a thread wound core and a cover covering the thread wound core, the thread wound core comprising a solid center and a thread rubber layer formed by winding thread rubber around the solid center, the cover having two layered structure comprising an inner layer cover and an outer layer cover, wherein the inner layer cover has a specific gravity of 1–1.8 and a thickness of 0.5–3 mm, the outer layer cover has a specific gravity of 0.9–1.1 and a thickness of 1–3 mm, the specific gravity of the inner layer cover is larger than that of the outer layer cover, the solid center has a diameter of from 28 to 35 mm, the thread rubber has a thickness of from 1 to 5.5 mm, and a ratio of (diameter (mm) of the solid center) (amount of deformation (mm) formed by applying a load of from an initial load of 10 Kg to a final load of 130 Kg to the thread wound core) is from 5 to 15.

DETAILED DESCRIPTION OF THE INVENTION

In the present invention, the specific gravity of the inner layer cover is adjusted to 1–1.8 and the thickness of the inner layer cover is adjusted to 0.5–3 mm. When the specific gravity of the inner layer cover is smaller than 1, it is substantially impossible to adjust the specific gravity of the inner layer cover to the value larger than that of the outer layer cover.

Therefore, flight distance is not improved. On the other hand, when the specific gravity of the inner layer cover is larger than 1.8, the amount of a filler formulated into the inner layer cover is too large and, therefore, the rebound performance of the cover is lowered. When the thickness of the inner layer cover is smaller than 0.5 mm, the technical effect with increasing the specific gravity of the inner layer cover is not sufficiently exhibited and, therefore, flight distance is not improved. On the other hand, when the thickness of the inner layer cover is larger than 1.8 mm, the inner layer cover with relatively poor rebound performance largely occupies and, the rebound performance of the golf ball is degraded.

In the present invention, the specific gravity of the outer layer cover is adjusted to 0.9–1.1 and the thickness of the outer layer cover is adjusted to 1–3 mm. When the specific gravity of the outer layer cover is smaller than 0.9, the inner part is heavy in a weight distribution of the golf ball and an inertia moment of the golf ball is small. Therefore, flight distance is poor. On the other hand, when the specific gravity of the outer layer cover is larger than 1.1, the rebound performance is lowered due to the same reason as that in case of the inner layer cover. When the thickness of the outer layer cover is smaller than 1 mm, the rebound performance is lowered and, therefore, flight distance is poor. On the other hand, when the thickness of the outer layer cover is larger than 3 mm, shot feel is poor.

In the present invention, the specific gravity of the inner layer cover is adjusted to the value larger than that of the outer layer cover. The spin amount of the golf ball, when flying, does not diminish so much and flight distance increases.

In the present invention, the diameter of the solid center is adjusted to 28–35 mm. When the diameter of the solid center is smaller than 28 mm, the spin amount when hit the ball increases and flight distance decreases. On the other hand, when the diameter of the solid center is larger than 35 mm, the thickness of the thread rubber layer decreases and the rebound performance of the thread rubber is not sufficiently utilized. Longer flight distance is hardly attained and, further, shot feel is also poor.

In the present invention, the thickness of the thread rubber layer is adjusted to 1–5.5 mm. When the thickness of the thread rubber layer is smaller than 1 mm, the rebound performance of the thread rubber layer is not sufficiently utilized and flight distance is poor. On the other hand, when the thickness of the thread rubber layer is larger than 5.5 mm, the spin amount increases and flight distance is poor.

In the present invention, it is necessary that the value of (diameter (mm) of the solid center)/(amount of deformation formed by applying a load of from an initial load of 10 Kg to a final load of 130 Kg to the thread wound core) is from 5 to 15. It is particularly preferred that the value is from 6 to 13. When the value is smaller than 5, the tension strength of the thread rubber is small and therefore, the rebound performance of the thread rubber is not sufficiently exhibited. On the other hand, when the value is larger than 15, the tension strength of the thread rubber is large and therefore, the thread wound core is hard and shot feel is poor.

The solid center is obtained by vulcanization-molding a rubber composition. The base rubber of the rubber composition for solid center is not specifically limited, but is preferably polybutadiene, particularly high-cis polybutadiene, which provides with high rebound performance. In the preparation of the rubber composition for solid center, it is preferred that the base rubber is made from the high-cis polybutadiene or a mixture of the high-cis polybutadiene and the other rubber. The high-cis polybutadiene can be used for either sulfur vulcanization or another vulcanization using $\alpha,\beta$-unsaturated carboxylic acid metal salt.

The thread rubber layer is formed by winding the thread rubber in a stretched state around the solid center. The thread rubber can be the same one as that has hitherto been used. For example, it can be obtained by vulcanizing a rubber composition which comprises a natural rubber or a mixture of the natural rubber and synthetic polyisoprene, sulfur, a vulcanization aid, a vulcanization accelerator, an antioxidants and the like.

The inner layer cover of the present invention is preferably formed from an ionomer resin or a mixture thereof, as the base resin. The ionomer resin may be a copolymer of $\alpha$-olefin and $\alpha,\beta$-unsaturated carboxylic acid having 3 to 8 carbon atoms, of which a portion of carboxyl groups is neutralized with metal ion.

Examples of the ionomer resins which are suitable for the inner layer cover include high-rigidity grade ionomer resins which are commercially available from Mitsui Du Pont Polychemical Co. under the trade name of Hi-milan 1605 (Na), Hi-milan 1707 (Na), Hi-milan 1706 (Zn), Hi-milan AM7318 (Na), Hi-milan AM7315 (Zn), Hi-milan AM7317 (Zn), etc.; high-rigidity grade ionomer resins which are commercially available from Du Pont U.S.A. Co. under the trade name of Surlyn 8940 (Na), Surlyn 8920 (Na), Surlyn 7940 (Li), etc.; and high-rigidity grade ionomer resins which are commercially available from Exxon Chemical Co. under the trade name of Iotek 8000 (Na), etc., but are not limited thereto. Na, Zn and Li, which are described in parentheses after the trade name of the above ionomer resin indicate their neutralizing metal ion species. In addition to the above high-rigid ionomer resins, a low-rigid ionomer resin such as terpolymer type ionomer resin, etc. can also be used for mixing with the ionomer resins.

The outer layer cover of the present invention is generally formed from ionomer resin or a mixture of ionomer resin with other resin. It is preferred that the hardness of the outer layer cover is lower than that of the inner layer cover so as to make shot feel (shot feel when hitting) soft.

As described above, ionomer resin or a mixture of the ionomer resin and the other resin can be used for the outer layer cover, but examples of the mixture of the ionomer resin and other resin are a mixture of an ionomer resin and a glycidyl group-modified thermoplastic elastomer; a mixture of an ionomer resin, a maleic anhydride-modified thermoplastic elastomer and a glycidyl group-modified thermoplastic elastomer; a mixture of an ionomer resin and a terpolymer of ethylene-unsaturated carboxylic ester-unsaturated carboxylic acid; and the like.

When using the ionomer resin for the outer layer cover, a low-rigid ionomer resin is preferably used. Examples of the low-rigid ionomer resins are terpolymer ionomer resins which are commercially available from Mitsui Du Pont Polychemical Co., Ltd. under the trade name of Hi-milan 1856 (Na), Hi-milan 1855 (Zn), Hi-milan AM7316 (Zn), etc.; and terpolymer ionomer resins which are commercially available from Du Pont U.S.A. Co. under the trade name of Surlyn AD8265 (Na), Surlyn AD8269 (Na), etc. It is also possible to use the high-rigid ionomer resin as listed above for the outer layer cover.

Examples of the glycidyl group-modified thermoplastic elastomers are ethylene-glycidyl methacrylate-methyl acrylate terpolymer and ethylene-glycidyl methacrylate-vinyl acetate terpolymer, which are commercially available from Sumitomo Chemical Industries Co., Ltd. under the trade name of Bondfast; glycidyl methacrylate adducts of hydrogenated styrene-butadiene-styrene block copolymers, which are commercially available from Asahi Kasei Industries Co., Ltd. under the trade name of Taftek Z513 and Taftek Z514; and ethylene-acrylate-glycidyl methacrylate terpolymer, which is commercially available from Du Pont USA under the trade name of Elvaloy-AS.

Examples of the maleic anhydride-modified thermoplastic elastomers are maleic anhydride adducts of hydrogenated styrene-butadiene-styrene block copolymers, which are commercially available from Asahi Kasei Industries Co., Ltd. under the trade name of Taftek M series; ethylene-ethyl acrylate-maleic anhydride terpolymers, which are commercially available from Sumitomo Chemical Industries Co., Ltd. under the trade name of Bondine; and products obtained by graft-modifying ethylene-ethyl acrylate copolymers with maleic anhydride, which are commercially available from Mitsui Du Pont Polychemical Co., Ltd. under the trade name of AR series.

Examples of the ethylene-unsaturated carboxylate-unsaturated carboxylic acid terpolymers are ethylene-isobutyl acrylate-methacrylic acid terpolymers which are commercially available from Mitsui Du Pont Polychemical Co., Ltd. under the trade name of "Neucrel AN4212C", "Neucrel N0805J" and the like.

When the outer layer cover is formed from the mixture of the ionomer resin and the other resin, a mixing weight ratio is not specifically limited. For example, the weight ratio of the ionomer resin to the other resin (e.g. glycidyl group-modified thermoplastic elastomer, maleic anhydride-modified thermoplastic elastomer, ethylene-unsaturated carboxylate-unsaturated carboxylic acid terpolymer, etc.) is preferably adjusted within the range from about 95:5 to 55:45 because the desired hardness is easily obtained.

The inner layer cover and outer layer cover may contains various additives such as pigments, dispersants, antioxidants, UV absorbers, photostabilizers, etc., in addition to the resin component.

It is preferred to add a high-specific gravity filler to adjust the specific gravity in the preparation of the inner layer cover in order that the specific gravity of the inner layer cover is adjusted to 1–1.8, preferably 1.15–1.6. Examples of the high-specific gravity fillers are metal powder, metal oxide, metal nitride, metal carbide and the like. Specific examples thereof include tungsten, tungsten carbide, molybdenum, lead, lead oxide, nickel, copper or a mixture thereof. In addition to the above high-specific gravity filler, barium sulfate, titanium dioxide or zinc oxide whose specific gravity is comparatively small may also be used. When the specific gravity is adjusted by using only the filler, the amount of the filler is increased. Therefore, the dispersibility of the filler is poor and the rebound performance of the inner layer cover is also degraded.

A method of covering the inner layer cover and outer layer cover is not specifically limited, and may be one which has been used. For example, it includes a method comprising molding the composition for inner layer cover into semi-spherical half-shells, covering a core (a thread wound core of a solid center and a thread rubber layer) with the two half-shells, followed by pressure molding at 130° to 170° C. for 1 to 5 minutes, or a method comprising injection-molding the cover composition for the inner layer cover directly to cover the core. Regarding the outer layer cover, the same covering method as that used in case of the inner layer cover is used. It can be a method comprising molding the composition for outer layer cover into semi-spherical half-shells, covering a core with the two half-shells, followed by pressure molding at 130° to 170° C. for 1 to 5 minutes, or a method comprising injection-molding the composition for outer layer cover directly to cover the core. In case of forming the outer layer cover, dimples may be optionally formed on the surface of the outer layer cover. Further, a paint or marking may be optionally provided after the outer layer cover was formed.

One embodiment of the thread wound golf ball of the present invention will be explained with reference to the accompanying drawing. FIG. 1 is a schematic cross section illustrating one embodiment of the golf ball of the present invention. In FIG. 1, 1 is a thread wound core which is composed of a solid center 1a and a thread rubber layer 1b. 2 is a cover which has a two-layer structure of an inner layer cover 2a and an outer layer cover 2b. 3 indicates dimples provided on the surface of the outer layer cover 2b.

The solid center 1a is composed of a vulcanization-molded article of a rubber composition. The thread rubber layer 1b is formed by winding thread rubber in a stretched state around the solid center 1a.

The diameter of the solid center 1a is from 28 to 35 mm and the thickness of the thread rubber layer 1b is from 1 to 5.5 mm. It is necessary that the value of (diameter (mm) of the solid center)/(amount of deformation (mm) formed by applying a load of from an initial load of 10 Kg to a final load of 130 Kg to the thread wound core) is within the range from 5 to 15.

The thread wound core 1 is covered with the inner layer cover 2a and the specific gravity and thickness of the inner layer cover 2a are 1–1.8 and 0.5–3 mm, respectively. The inner layer cover 2a is covered with the outer layer cover 2b and the specific gravity and thickness of the outer layer cover 2b are 0.9–1.1 and 1–3 mm, respectively. The specific gravity of the inner layer cover is larger than that of the outer layer cover. It is particularly preferred that the specific gravity of the inner layer cover is within the range of 1.15 to 1.6.

Suitable number of dimples 3 are optionally provided on the surface of the outer layer cover 2b according to the desired characteristics.

As described above, according to the present invention, there could be provided a multi-layer structure golf ball using a thread wound core, which has good shot feel and attains long flight distance.

EXAMPLES

The following Examples and Comparative Examples further illustrate the present invention in detail but are not to be construed to limit the scope thereof.

Examples 1 to 7 and Comparative Examples 1 to 4

Golf balls of Examples 1 to 7 and Comparative Examples 1 to 4 were produced through the following processes (1) to (3).

(1) Production of solid center and thread wound core

A rubber composition was prepared by formulating 20 parts by weight of zinc acrylate, 1.5 parts by weight of dicumyl peroxide, 15 parts by weight of zinc oxide and 0.5 parts by weight of an antioxidant [Noclak NS-6 (trade name), manufactured by Ohuchi Shinko Kagaku Kogyo Co., Ltd.] to 100 parts by weight of a polybutadiene rubber [JSR BR11 (trade name) manufactured by Japan Synthetic Rubber Co., Ltd., content of 1,4cis-polybutadiene: 96%] to give a base composition to which barium sulfate was added for changing the weight of a solid center.

The resulting rubber composition was charged in a mold for center and then vulcanized by heating at 165° C. under pressure for 20 minutes to produce six kinds of solid centers in different diameter and weight.

The diameter, weight and surface hardness (hardness measured by a JIS-C type hardness tester) of the resulting solid centers are shown in the following Table 1 to Table 3.

Then, a thread rubber layer was formed by winding thread rubber around the solid center to produce a thread wound core. The thread rubber was made from a mixture of natural rubber and low-cis synthetic polyisoprene [Shell IR-309 (trade name), manufactured by Shell Chemistry Co.], of which a mixing weight ratio is 50/50. Regarding Comparative Example 4, the diameter of the solid center was made large, i.e. 36.7 mm, and the thread rubber layer is not formed. Accordingly, a solid golf ball was obtained in Comparative Example 4, and multi-layer structure golf balls using the thread wound cores were obtained in Examples 1 to 7 and Comparative Examples 1 to 3 except for Comparative Example 4.

An amount of deformation formed by applying a load of from an initial load of 10 Kg to a final load of 130 Kg to the thread wound core was measured. The resulting amount of deformation and a value of (diameter (mm) of the solid center)/(amount of deformation formed by applying a load of from an initial load of 10 Kg to a final load of 130 Kg to the thread wound core) are shown in Table 1 to Table 3. In case of indicating in the tables, the above ratio of (diameter (mm) of the solid center)/(amount of deformation formed by applying a load of from an initial load of 10 Kg to a final load of 130 Kg to the thread wound core) is represented by (a)/(b).

TABLE 1

| | Example No. | | | |
|---|---|---|---|---|
| | 1 | 2 | 3 | 4 |
| Solid center: | | | | |
| Diameter (mm) | 28.0 | 31.0 | 33.0 | 33.0 |

TABLE 1-continued

| | Example No. | | | |
|---|---|---|---|---|
| | 1 | 2 | 3 | 4 |
| Weight (g) | 15.7 | 19.5 | 22.2 | 22.4 |
| Surface hardness (JIS-C) | 70 | 70 | 70 | 70 |
| Thread rubber layer: | | | | |
| Thickness (mm) | 4.35 | 2.85 | 1.35 | 1.85 |
| Amount of deformation (mm) | 2.8 | 3.0 | 3.5 | 3.3 |
| (a)/(b) | 10 | 10.3 | 9.4 | 10 |

TABLE 2

| | Example No. | | |
|---|---|---|---|
| | 5 | 6 | 7 |
| Solid center: | | | |
| Diameter (mm) | 35.0 | 31.0 | 31.0 |
| Weight (g) | 25.7 | 19.5 | 19.5 |
| Surface hardness (JIS-C) | 70 | 70 | 70 |
| Thread rubber layer: | | | |
| Thickness (mm) | 2.35 | 2.85 | 2.85 |
| Amount of deformation (mm) | 3.3 | 5.0 | 2.5 |
| (a)/(b) | 10.6 | 6.2 | 12.4 |

TABLE 3

| | Comparative Example No. | | | |
|---|---|---|---|---|
| | 1 | 2 | 3 | 4 |
| Solid center: | | | | |
| Diameter (mm) | 27.0 | 28.0 | 31.0 | 36.7 |
| Weight (g) | 14.5 | 17.6 | 19.5 | 28.6 |
| Surface hardness (JIS-C) | 70 | 70 | 70 | 70 |
| Thread rubber layer: | | | | |
| Thickness (mm) | 4.85 | 5.85 | 2.85 | — |
| Amount of deformation (mm) | 2.6 | 2.8 | 6.3 | — |
| (a)/(b) | 10.4 | 10 | 4.9 | — |

(2) Production of cover composition

The formulation materials shown in Table 4 were mixed using a kneading type twin-screw extruder to obtain pelletized cover compositions A to G. The amount of each material described in the tables is represented by parts by weight. The extrusion conditions were a screw diameter: 45 mm; a screw revolution per minute: 200 rpm; a screw L/D: 35. The formulation components were heated at 200° to 260° C. at the die position of the extruder.

The specific gravity and Shore D-scale hardness of the resulting cover compositions were measured. The results are shown in Table 4. The Shore D-scale hardness was measured according to ASTM D-2240 after a sheet having a thickness of about 2 mm obtained by heat-press molding was preserved at 23° C. for two weeks.

TABLE 4

| | | A | B | C | D | E | F | G |
|---|---|---|---|---|---|---|---|---|
| Hi-milan 1605 | *1 | 50 | 25 | 0 | 0 | 50 | 50 | 50 |
| Hi-milan 1706 | *2 | 50 | 0 | 0 | 0 | 50 | 50 | 50 |
| Hi-milan 1855 | *3 | 0 | 50 | 0 | 0 | 0 | 0 | 0 |
| Hi-milan 1557 | *4 | 0 | 25 | 0 | 0 | 0 | 0 | 0 |
| Hi-milan AM7317 | *5 | 0 | 0 | 50 | 0 | 0 | 0 | 0 |
| Hi-milan AM7318 | *6 | 0 | 0 | 50 | 0 | 0 | 0 | 0 |
| Surlyn AD8511 | *7 | 0 | 0 | 0 | 30 | 0 | 0 | 0 |
| Surlyn AD8512 | *8 | 0 | 0 | 0 | 30 | 0 | 0 | 0 |
| AR-201 | *9 | 0 | 0 | 0 | 25 | 0 | 0 | 0 |
| Taftek Z514 | *10 | 0 | 0 | 0 | 15 | 0 | 0 | 0 |
| Tungsten | | 0 | 0 | 0 | 0 | 15.5 | 38 | 96.5 |
| Titanium dioxide | | 2 | 2 | 2 | 2 | 0 | 0 | 0 |
| Barium sulfate | | 2 | 2 | 2 | 2 | 0 | 0 | 0 |
| Specific gravity | | 0.99 | 0.99 | 0.99 | 0.99 | 1.1 | 1.3 | 1.8 |
| Shore D-scale hardness | | 63 | 58 | 66 | 51 | 63 | 64 | 66 |

*1: Hi-milan 1605 (trade name), ethylene-methacrylic acid copolymer ionomer resin neutralized with sodium ion, manufactured by Mitsui Du Pont Polychemical Co., Ltd., MI (melt index)=2.8, flexural modulus: about 310 MPa.

*2: Hi-milan 1706 (trade name), ethylene-methacrylic acid copolymer ionomer resin neutralized with zinc ion, manufactured by Mitsui Du Pont Polychemical Co., Ltd., MI=0.8, flexural modulus: about 260 MPa.

*3: Hi-milan 1855 (trade name), ethylene-butyl acrylate-methacrylic acid terpolymer ionomer resin neutralized with zinc ion, manufactured by Mitsui Du Pont Polychemical Co., Ltd., MI=1.0, flexural modulus: about 90 MPa.

*4: Hi-milan 1557 (trade name), ethylene-methacrylic acid copolymer ionomer resin neutralized with zinc ion, manufactured by Mitsui Du Pont Polychemical Co., Ltd., MI=5.0, flexural modulus: about 230 MPa.

*5: Hi-milan AM7317 (trade name), ethylene-methacrylic acid copolymer ionomer resin neutralized with zinc ion, manufactured by Mitsui Du Pont Polychemical Co., Ltd., MI=1.2, flexural modulus: about 270 MPa.

*6: Hi-milan AM7318 (trade name), ethylene-methacrylic acid copolymer ionomer resin neutralized with sodium ion, manufactured by Mitsui Du Pont Polychemical Co., Ltd., MI=2.1, flexural modulus: about 340 MPa.

*7: Surlyn AD8511 (trade name), ethylene-methacrylic acid copolymer ionomer resin neutralized with zinc ion, manufactured by Du Pont Co., MI=3.4, flexural modulus: about 220 MPa.

*8: Surlyn AD8512 (trade name), ethylene-methacrylic acid copolymer ionomer resin neutralized with Na ion, manufactured by Du Pont Co., MI=4.4, flexural modulus: about 280 MPa.

*9: AR-201 (trade name), product obtained by graft-modifying ethylene-ethyl acrylate copolymer ionomer resin with maleic anhydride, manufactured by Mitsui Du Pont Polychemical Co., Ltd., JIS-A hardness: 51.

*10: Taftek Z514 (trade name), glycidyl methacrylate adduct of styrene-butadiene-styrene block copolymer, manufactured by Asahi Kasei Kogyo Co., Ltd., JIS-A hardness: 84, content of styrene: about 30% by weight, content of butadiene: about 70% by weight, content of glycidyl methacrylate: about 1% by weight.

(3) Production of golf ball

The cover compositions E, F and G described in Table 4 were molded into semi-spherical half-shells. The thread wound core of the above item (1) was covered with the two half-shells, followed by press-molding in a mold for golf balls at 150° C. for 2 minutes to form an inner layer cover. Then, the cover compositions A, B, C and D described in Table 4 were injection-molded on the inner layer cover to produce an outer layer cover. Paint was applied on the surface to produce a golf ball having an outer diameter of 42.7 mm. In Comparative Example 4, the inner layer cover and outer layer cover were formed on the solid center in the same manner as described above to produce a golf ball having an outer diameter of 42.7 mm.

The diameter of the solid center, thickness of the thread rubber layer, (a)/(b) i.e. value of (diameter (mm) of the solid center)/(amount of deformation formed by applying a load of from an initial load of 10 Kg to a final load of 130 Kg to the thread wound core), and the kind, specific gravity and thickness of the inner layer cover and outer layer cover are shown in Table 5 to Table 7. The inner layer cover and outer layer cover used are represented by the symbols A to G of the cover compositions in Table 5 to Table 7.

The ball weight, flight performance and impact force of the resulting golf ball were measured. Regarding the flight performance, the ball initial velocity, spin amount and flight distance (carry: distance to the landing point of a ball) were measured by a No. 1 wood club attached to a swing robot manufactured by True Temper Co. and hitting a golf ball at a head speed of 45 m/second. The impact force was determined by hitting a golf ball at a head speed of 45 m/second by a No. 1 wood club wherein an acceleration pickup was attached to the back part of the club head, measuring an acceleration formed in the direction opposite to the forward direction of the head and transforming a maximum value of the acceleration into a force. The impact force was indicated by an index when the force of the golf ball of Comparative Example 4 is 100. The smaller the value, the smaller the impact force is.

The resulting golf balls were evaluated by 10 top professional golfers according to a practical hitting test using a No. 1 wood club. The evaluation criteria are as follows. The results shown in the Tables below are based on the fact that not less than 8 out of 10 professional golfers evaluated with the same criterion about each test item.

Evaluation criteria
○: soft feel, good
XS: shot feel is too soft and sticky feel, poor
XH: shot feel is hard and poor The evaluation results of physical properties and shot feel of the golf balls of Examples 1 to 4 thus obtained as described above are shown in Table 5, together with the diameter of the solid center, thickness of the thread rubber layer, (a)/(b) i.e. value of (diameter (mm) of the solid center)/(amount of deformation formed by applying a load of from an initial load of 10 Kg to a final load of 130 Kg to the thread wound core), and the kind, specific gravity and thickness of the inner layer cover and outer layer cover. Values of Examples 5 to 7 are shown in Table 6, and values of Comparative Examples 1 to 4 are shown in Table 7.

TABLE 5

|  | Example No. | | | |
|---|---|---|---|---|
|  | 1 | 2 | 3 | 4 |
| Diameter of solid center (mm) | 28.0 | 31.0 | 33.0 | 33.0 |
| Thickness of thread rubber layer (mm) | 4.35 | 2.85 | 1.35 | 1.85 |
| (a)/(b) | 10 | 10.3 | 9.4 | 10 |
| Kind of inner layer cover | E | F | F | F |

TABLE 5-continued

|  | Example No. | | | |
|---|---|---|---|---|
|  | 1 | 2 | 3 | 4 |
| Specific gravity of inner layer cover | 1.1 | 1.3 | 1.3 | 1.3 |
| Thickness of inner layer cover (mm) | 1.5 | 1.5 | 2.0 | 1.5 |
| Kind of outer layer cover | A | B | C | D |
| Specific gravity of outer layer cover | 0.99 | 0.99 | 0.99 | 0.99 |
| Thickness of outer layer cover (mm) | 1.5 | 1.5 | 2.0 | 1.5 |
| Ball physical properties |  |  |  |  |
| Ball weight (g) | 45.3 | 45.3 | 45.3 | 45.3 |
| Ball initial velocity (feet/second) | 64.5 | 64.4 | 64.5 | 64.4 |
| Spin amount (rpm) | 2850 | 2780 | 2730 | 2750 |
| Flight distance (yard) | 225.0 | 225.3 | 225.5 | 225.2 |
| Impact force (index) | 80 | 83 | 85 | 82 |
| Shot feel | ○ | ○ | ○ | ○ |

TABLE 6

|  | Example No. | | |
|---|---|---|---|
|  | 5 | 6 | 7 |
| Diameter of solid center (mm) | 35.0 | 31.0 | 31.0 |
| Thickness of thread rubber layer (mm) | 2.35 | 2.85 | 2.85 |
| (a)/(b) | 10.6 | 6.2 | 12.4 |
| Kind of inner layer cover | G | F | F |
| Specific gravity of inner layer cover | 1.8 | 1.3 | 1.3 |
| Thickness of inner layer cover (mm) | 0.5 | 1.5 | 1.5 |
| Kind of outer layer cover | B | B | B |
| Specific gravity of outer layer cover | 0.99 | 0.99 | 0.99 |
| Thickness of outer layer cover (mm) | 1.0 | 1.5 | 1.5 |
| Ball physical properties |  |  |  |
| Ball weight (g) | 45.3 | 45.2 | 45.4 |
| Ball initial velocity (feet/second) | 64.5 | 64.2 | 64.6 |
| Spin amount (rpm) | 2680 | 2650 | 2850 |
| Flight distance (yard) | 225.8 | 224.8 | 225.5 |
| Impact force (index) | 85 | 78 | 88 |
| Shot feel | ○ | ○ | ○ |

TABLE 7

|  | Comparative Example No. | | | |
|---|---|---|---|---|
|  | 1 | 2 | 3 | 4 |
| Diameter of solid center (mm) | 27.0 | 28.0 | 31.0 | 36.7 |
| Thickness of thread rubber layer (mm) | 4.85 | 5.85 | 2.85 | 0 |
| (a)/(b) | 10.4 | 10 | 4.9 |  |
| Kind of inner layer cover | F | F | E | F |
| Specific gravity of inner layer cover | 1.3 | 1.3 | 1.1 | 1.3 |
| Thickness of inner layer cover (mm) | 1.5 | 0.5 | 1.5 | 1.5 |
| Kind of outer layer cover | A | A | A | A |
| Specific gravity of outer layer cover | 0.99 | 0.99 | 0.99 | 0.99 |
| Thickness of outer layer cover (mm) | 1.5 | 1.0 | 1.5 | 1.5 |
| Ball physical properties |  |  |  |  |
| Ball weight (g) | 45.3 | 45.3 | 45.3 | 45.3 |
| Ball initial velocity (feet/second) | 64.5 | 64.5 | 63.5 | 64.2 |
| Spin amount (rpm) | 3050 | 3100 | 2830 | 2730 |
| Flight distance (yard) | 223.5 | 222.0 | 221.5 | 223.0 |
| Impact force (index) | 79 | 75 | 80 | 100 |
| Shot feel | ○ | ○ | XS | XH |

As is apparent from a comparison between physical properties of the golf balls of Examples 1 to 7 shown in Table 5 to Table 6 and those of the golf balls of Comparative Examples 1 to 4 shown in Table 7, the golf balls of Examples 1 to 7 attained long flight distance, and the shot feel was soft and good. That is, although the golf ball of Examples 1 to 7 are multi-layer structure golf balls using a thread wound core, they attained a flight distance of 224.8–225.8 yards. The flight distance was larger than that of the solid golf ball of Comparative Example 4 and all of their evaluation results of the shot feel were good.

To the contrary, regarding the golf ball of Comparative Example 1, the spin amount is larger because the diameter of the solid center is small. Therefore, long flight distance was not attained because of its blown trajectory. Regarding the golf ball of Comparative Example 2, the spin amount is larger because the thickness of the thread rubber layer is too large such as 5.85 mm. Therefore, sufficient flight distance was not attained.

Regarding the golf ball of Comparative Example 3, the rebound performance of the thread rubber was not sufficiently utilized because a value of (diameter (mm) of the solid center)/(amount of deformation (mm) formed by applying a load of from an initial load of 10 Kg to a final load of 130 Kg to the thread wound core) is small such as 4.9. Therefore, sufficient flight distance was not attained. The reason why the value of (a)/(b) of Comparative Example 3 became small, as described above, is as follows. That is, as is apparent from the fact that the amount of deformation formed by applying a load of from an initial load of 10 Kg to a final load of 130 Kg to the thread wound core is large such as 6.3 mm as shown in Table 2, the thread rubber is loosely wound. Therefore, the rebound performance of the thread rubber is not sufficiently utilized and long flight distance was not attained as described above. Regarding the golf ball of Comparative Example 4, the rebound performance of the golf ball was smaller than that of the golf balls of Examples 1 to 7 because the thread rubber layer was not provided. Therefore, long flight distance was not attained and the shot feel was also hard and poor.

What is claimed is:

1. A golf ball comprising a thread wound core and a cover covering the thread wound core, the thread wound core comprising a solid center and a thread rubber layer formed by winding thread rubber around the solid center, the cover having two layered structure comprising an inner layer cover and an outer layer cover, wherein the inner layer cover has a specific gravity of 1–1.8 and a thickness of 0.5–3 mm, the outer layer cover has a specific gravity of 0.9–1.1 and a thickness of 1–3 mm, the specific gravity of the inner layer cover is larger than that of the outer layer cover, the solid center has a diameter of from 28 to 35 mm, the thread rubber has a thickness of from 1 to 5.5 mm, and a ratio of (diameter (mm) of the solid center)/(amount of deformation (mm) formed by applying a load of from an initial load of 10 Kg to a final load of 130 Kg to the thread wound core) is from 5 to 15.

2. The golf ball according to claim 1, wherein the inner layer cover is a specific gravity of from 1.15 to 1.6.

* * * * *